June 26, 1934.  J. A. SHAFER  1,964,183
CAR TRUCK
Filed Nov. 15, 1928  5 Sheets-Sheet 2
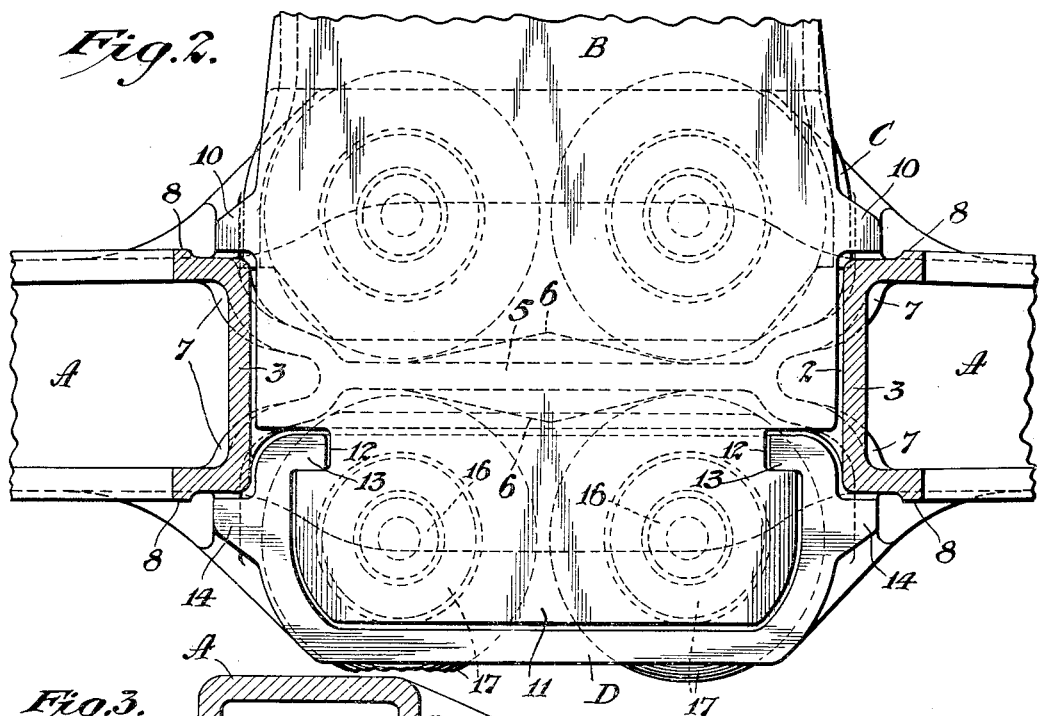
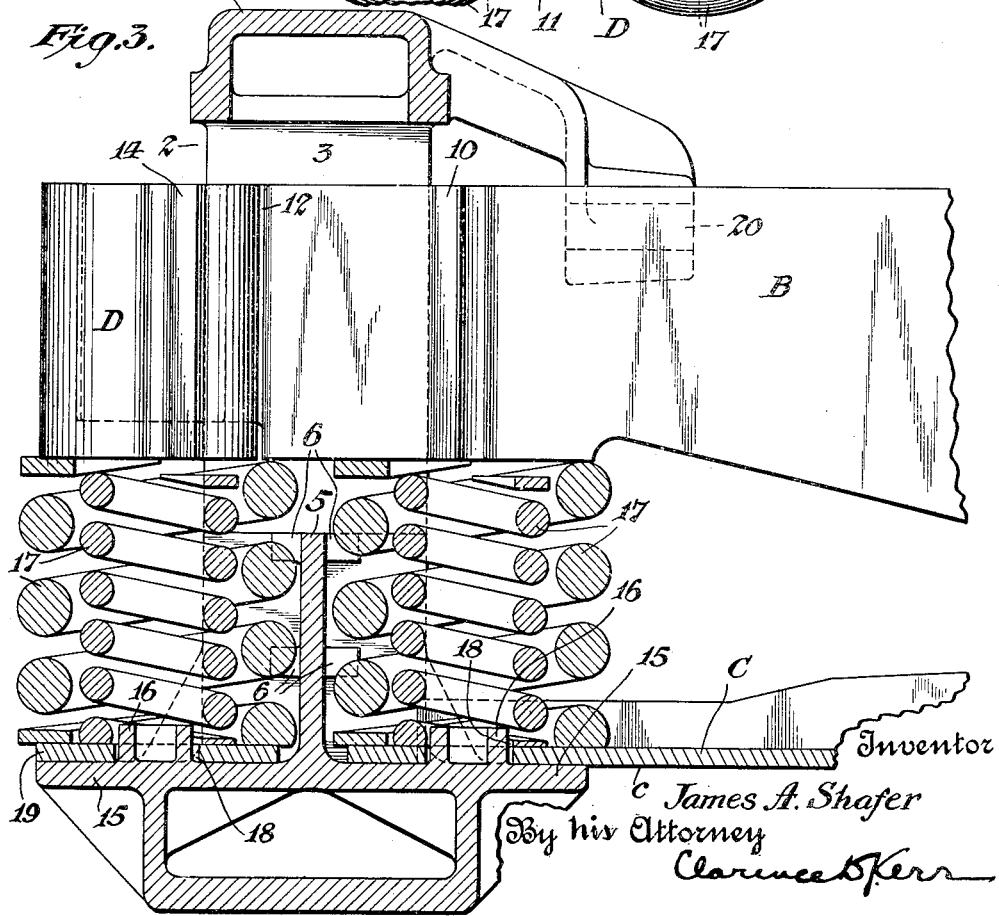
Inventor
James A. Shafer
By his Attorney
Clarence D. Kerr

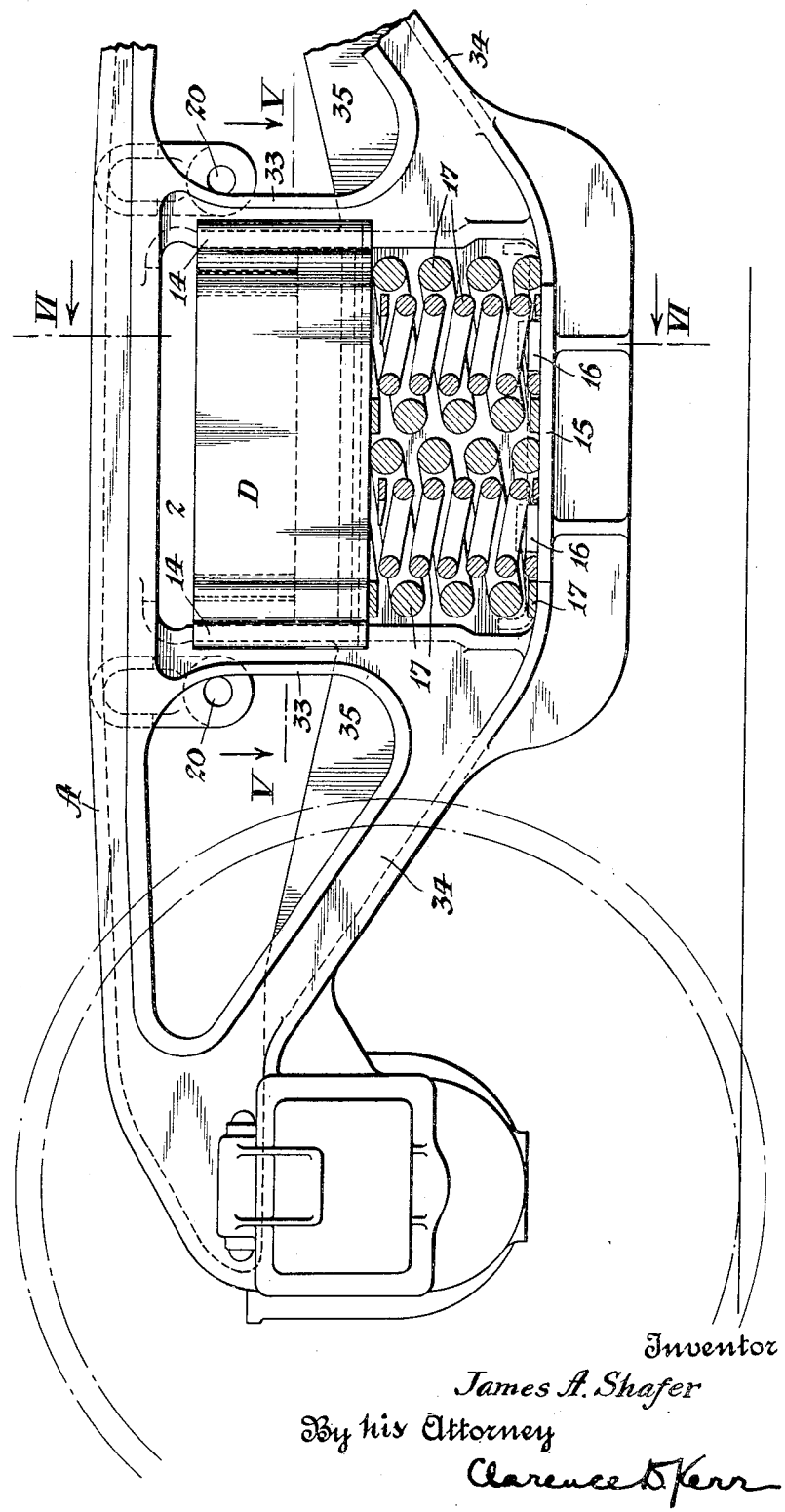

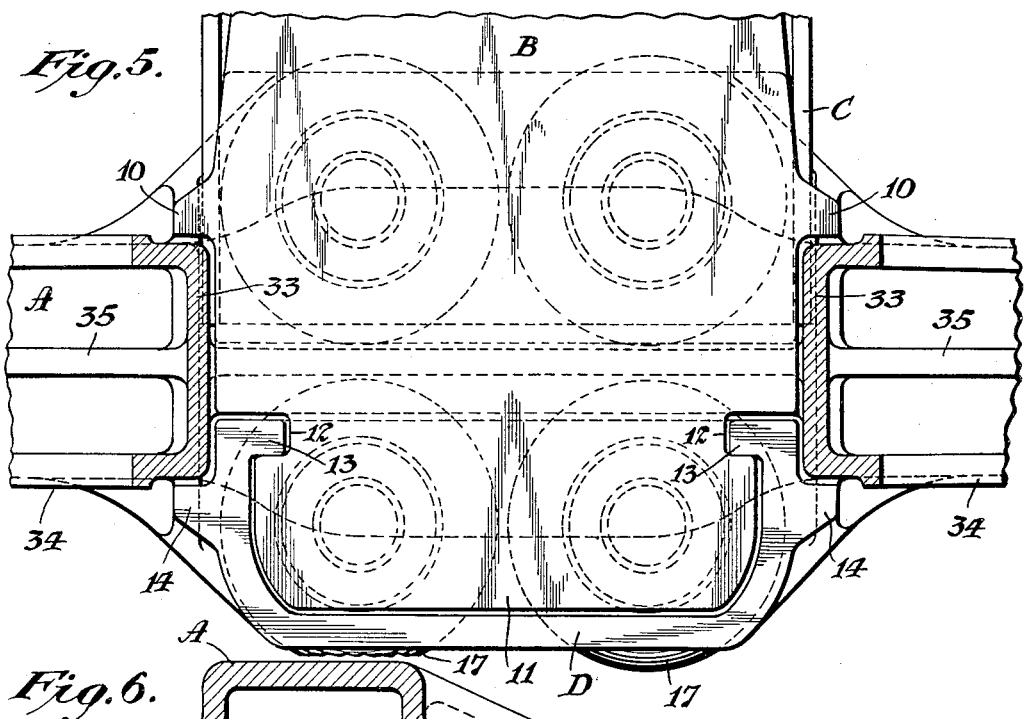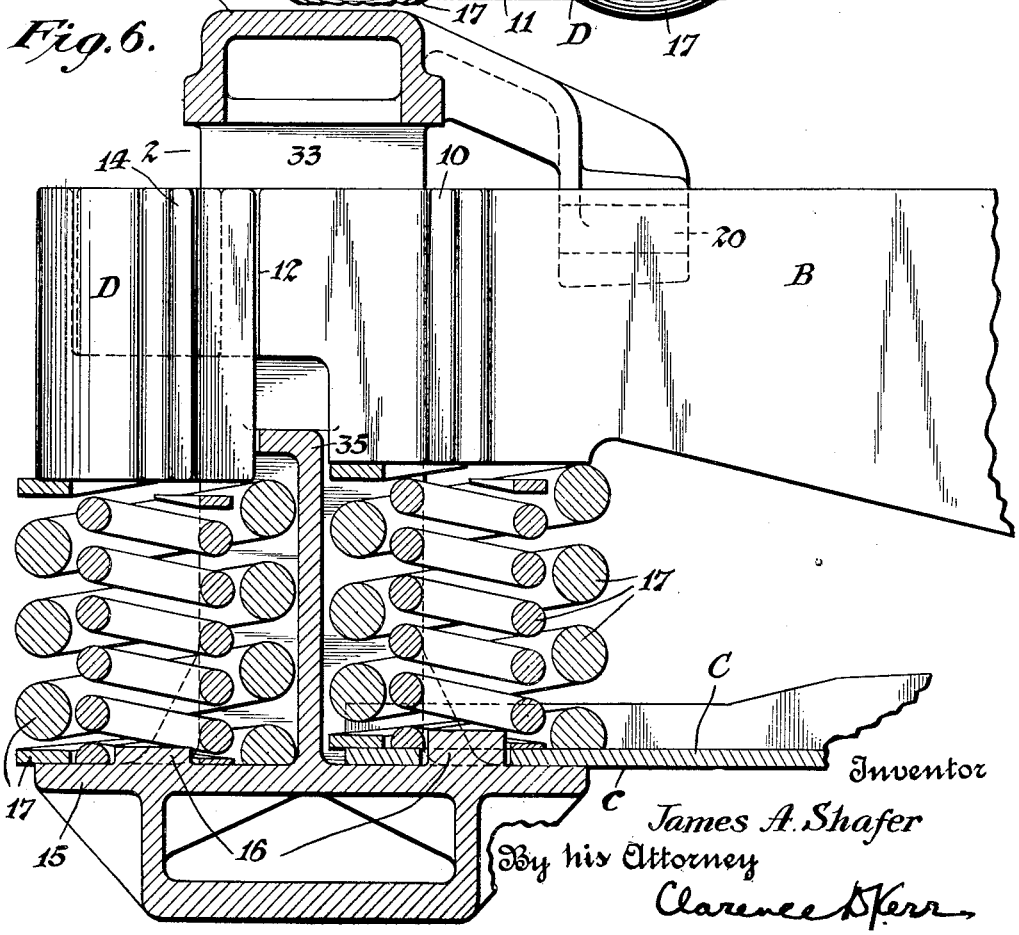

June 26, 1934.  J. A. SHAFER  1,964,183
CAR TRUCK
Filed Nov. 15, 1928   5 Sheets-Sheet 5

Inventor
James A. Shafer
By his Attorney
Clarence D. Kerr

Patented June 26, 1934

1,964,183

UNITED STATES PATENT OFFICE 1,964,183

CAR TRUCK

James A. Shafer, East Cleveland, Ohio, assignor to National Malleable and Steel Castings Company, Cleveland, Ohio, a corporation of Ohio Application November 15, 1928, Serial No. 319,500

2 Claims. (Cl. 105—197)

My invention relates to car trucks of the cast side frame type and particularly to trucks in which the side frames are of the integral journal box type. One of the principal objects of my invention is the provision of increased spring capacity with the least number of A. R. A. standard coils, at the same time strengthening and reinforcing the side frames, all of this being accomplished with a minimum of weight. By my improved construction assembly and disassembly of the truck is greatly facilitated and the changing of wheels can be easily and quickly carried out, and spring failures are averted by provision for relieving the springs from oversolid blows. My invention also makes possible a spring plank of simplified form, avoiding the special shapes which have heretofore had to be resorted to with increased spring capacity trucks. My improved structure also has provision for replacing the outer bolster guides to compensate for wear. My invention also comprises various features which I shall hereinafter describe and claim.

Figure 7:
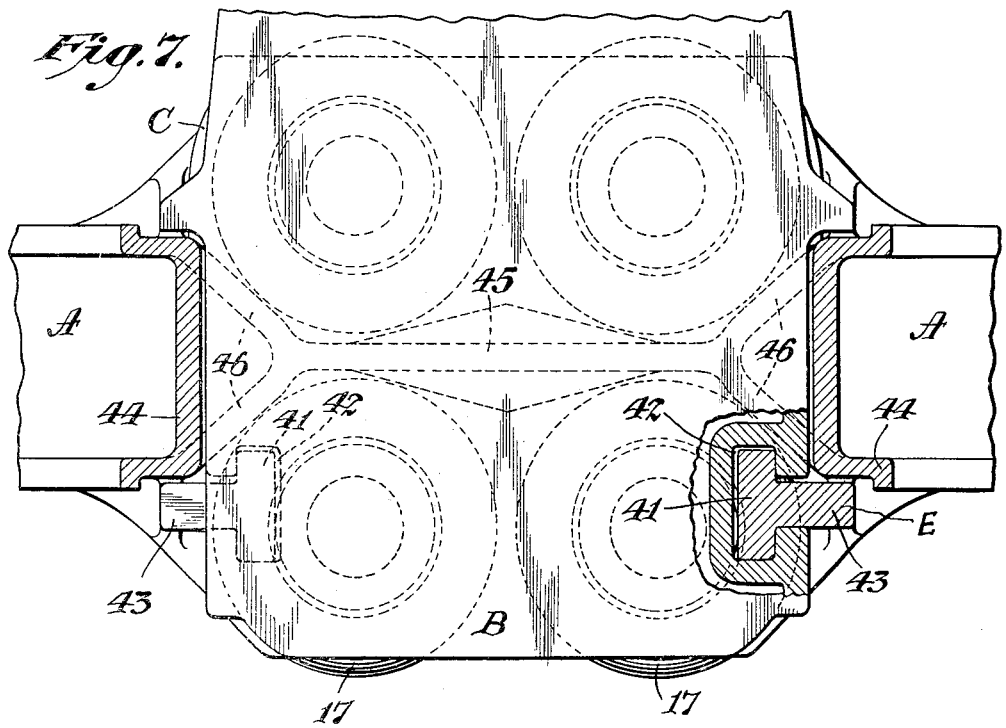
Figure 8:
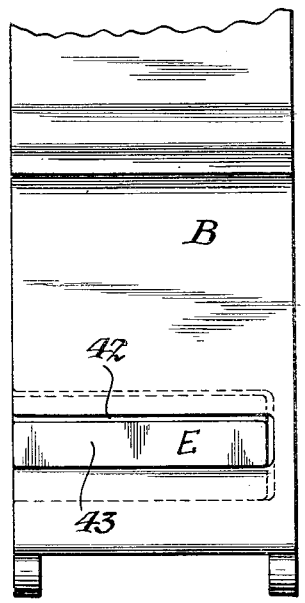

In the accompanying drawings, Fig. 1 is a side elevation of a car truck embodying my invention, the outer set of springs, however, being removed for the sake of clearness; Fig. 2 is a section on line II—II of Fig. 1, showing a portion of the truck bolster in top plan; Fig. 3 is a section on line III—III of Fig. 1, showing the bolster in side elevation; Fig. 4 is a partial section similar to Fig. 1, but showing a modified form of my invention; Fig. 5 is a section on line V—V of Fig. 4; Fig. 6 is a section on lines VI—VI of Fig. 4; Fig. 7 is a horizontal section with the bolster partly in plan, showing a modified form of my invention; and Fig. 8 is a side elevation of the end of the bolster embodying such modification.

Referring more particularly to the drawings, my improved truck comprises two side frames A (only one of which is here shown), a truck bolster B, a spring plank C, and a bolster assembly locking piece D.

The side frame A has, as is usual, a window opening 2 for reception of the bolster. As the usual outer guide flanges have been left off of the bolster, it is not necessary to have the usual deep offsets in the columns 3 at the lower corners of the window opening to permit the side frames to be passed over the bolster ends, and hence the columns 3 may be carried directly down to their intersection with the inclined tension members 4 of the frame in such a way that the section of metal along the line $a-a$, as is shown in Fig. 1, is greatly increased in section and is thus materially strengthened.

The columns 3 in their lower portions are joined by a deep vertically-disposed web 5 which extends longitudinally clear across the lower portion of the window 2, and ties together the columns 3 of the side frame, strengthening them against braking and lateral thrust loads imposed by the bolster, and strengthening the whole side frame against bending stresses. To prevent the web 5 from buckling it has on its sides laterally extending ribs 6, which preferably are widest at the center of the web. The web at each end is bifurcated where it joins the columns 3 and such bifurcations 7 blend into the side walls 8 of the tension members. It will thus be seen that the bifurcations 7 of the web serve greatly to increase the strength through the portions of the frame at the lower corners of the window opening indicated by the lines $a-a$, thus reinforcing what has proved to be the weakest point in the present standard design of side frame.

The bolster B has the usual inner guiding lugs 10 but at its outer end 11 terminates in a reduced portion which on its sides has vertically-disposed recesses 12 which are engaged by inwardly directed projections 13 on the locking cap D. The locking cap D has on its outer sides vertically disposed guiding lugs 14 which form the outer guides for the bolster and engage the outer surfaces of the guiding columns 3 of the side frame.

On either side of the webs 5 are the shelves 15, which have dowels 16 thereon for centering the springs 17. The spring plank C bears on the inner shelf 15 and is held thereon by means of the dowels 16 which seat in the holes 18 therein. The springs 17, of which I have shown four sets, are preferably class G springs, and hence give a greater spring capacity than the usual arrangement and types of springs normally used for supporting and cushioning the bolster. Class G springs have been extensively used both singly and in various combinations, in railway draft appliances, and are universally recognized as draft springs. Prior to my invention, they have not been employed between the bolsters and side frames of car trucks. By utilizing class G springs for supporting the bolster I am enabled to attain decidedly greater spring capacity with fewer spring units. As an example, it may be noted that four spring units of the class G type provide some 121,400 pounds spring capacity as compared with some 80,000 pounds capacity provided by five springs of the class H type which heretofore have been used as bolster supporting springs. In fact, four class G springs provide greater spring capacity than do seven class H springs. Not only do class G springs afford marked increase in spring capacity with fewer units but furthermore this result is attained without any sacrifice of easy riding qualities, the deflection of class G springs being at least as great as that of springs of the class H type.

In assembling my improved truck, the spring plank C is set up over the track on blocking. The inner sets of springs 17 are next put in place on the plank C and the bolster rested on top of them, after which the brake rigging is assembled. The side frames A are then moved directly over the bolster ends 11 until the lugs 10 engage the inner faces of the columns 3, and the dowels 16 come opposite the holes 18 in the spring plank C. The locking pieces D are slid by a vertical movement over the outer ends of the bolster with their projections 13 engaging in the recesses 12 of the bolster. The outer sets of springs 17 are next placed in position on the outer shelf on a spring plate 19 (used to bring the springs to the same level as the inner set of springs which seat on the spring plank C) and are centered by the dowels 16 and in such position support both the bolster B and locking piece D, and also prevent the separation of the locking piece and the bolster. The side frames are finally jacked up, bringing the inner pairs of dowels 16 into engagement with the holes 18 in the spring plank, the brake hanger pins inserted at 20, and the blocking removed. The truck has now been completely assembled and the jacks are lowered and removed.

The springs 17 are protected against oversolid blows by the web 5, since the space between the bottom of the bolster and the top surface of the web is so proportioned that the bolster will engage the top of the web before the springs are driven solid. It is to be noted, however, that when the bolster engages the top of the web, the load to which the web is subjected can only be equal to the difference between the total load imposed by the bolster and the capacity of the springs at this amount of compression (i. e., the capacity of the springs just before being driven solid). That portion of the load which is represented by the spring capacity is transmitted directly to the shelf portions 15 of the frame. The oversolid load is thus divided between the web 5 and the shelves 15 and it is this distribution of stress which has enabled me to obtain increased strength with a minimum of weight. Due to the comparative rigidity of the bolster ends, the portion of the oversolid load which is taken on the web 5 may be considered as being transmitted almost entirely to the top of the bifurcated end portions 7 thereof, thus greatly decreasing the bending moment on the tension member between the columns.

The changing of wheels, which normally requires the complete disassembly of the truck, is a simple matter with my improved structure. I first jack up the side frames, place blocking underneath the spring plank C, remove the four brake hanger pins at 20, and then remove the jacks. The outer sets of springs are now free to be removed and after they are taken out the locking caps D are dropped to disengage them from the ends of the bolster. The side frames may then be pulled off the axles and bolster, leaving the wheel and axle assemblies free to be removed. It will thus be seen that the removal of the wheels can be effected without disturbing the bolster, spring plank, inner sets of springs, or the brake rigging.

In Figs. 4, 5 and 6 I have shown a modified form of my invention, in which the central reinforcing web 35 may be extended beyond the columns 33 for the entire length of the tension members 34. It will be seen that this extension of the webs 35 gives additional strength to columns 33 to resist braking thrusts and lateral thrust loads, and also reinforces the tension member 34 against bending.

In Figs. 7 and 8 I have shown a further modification of my invention in which the locking mechanism is formed of two separate pieces E, which are T-shaped in cross-section. The heads 41 of the locking pieces E seat in vertically-disposed recesses 42 in the bolster, and, as the recesses 42 preferably do not extend clear through to the top of the bolster, the pieces are held in place between the springs and the ends of recesses 42 in the bolster. The stem 43 of the pieces extends outwardly beyond the sides of the bolster and forms guide flanges which engage the outer faces of the columns 44 and thus hold the bolster in operative relation in the side frame.

In assembling and disassembling the frame and bolster, it will be seen that the pieces E can be applied or removed even more readily than the locking piece D shown in Figs. 1-6, inclusive. Not only may the locking pieces E be handled more readily than the cap D because of their lighter weight, but the weight of the complete bolster end will also be somewhat less.

In this form of my invention I have also shown the reinforcing web 45 joined to the columns by the bifurcated portions 46 of the web in such a way as to still more effectively reinforce the frame against strains and oversolid blows.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a car truck, the combination of side frames, a bolster, a spring plank, and springs between bolster and side frames, each side frame having a central opening with vertical guide columns at the sides thereof, the bolster having bearing portions to engage the columns at the sides of each opening, and members secured in recesses in the sides of the bolster ends comprising guide flanges for the bolster engaging the guide columns, each of said recesses extending through a side wall of the bolster end and the corresponding member having a portion projecting through said side wall for engagement with the corresponding column and a portion retained by said recess within said bolster.

2. In a car truck the combination of side frames, a bolster, a spring plank, and springs between bolster and side frames, each side frame having a central opening with vertical guide columns at the sides thereof, the bolster having bearing portions to engage the columns at the sides of each opening, and members T-shaped in cross-section secured in correspondingly shaped recesses in the sides of the bolster ends, the stems of the T-shaped members comprising guide flanges for the bolster engaging the guide columns.

JAMES A. SHAFER.